(12) United States Patent
Jang et al.

(10) Patent No.: US 9,922,761 B2
(45) Date of Patent: Mar. 20, 2018

(54) MAGNETIC MATERIAL AND DEVICE FOR TRANSMITTING DATA USING THE SAME

(71) Applicant: SAMSUNG ELECTRO-MECHANICS CO., LTD., Suwon-si (KR)

(72) Inventors: Jae Hyuk Jang, Suwon-si (KR); Hee Seung Kim, Suwon-si (KR); Hyun Jung Lee, Suwon-si (KR); Jae Sun Won, Suwon-si (KR); Jung Young Cho, Suwon-si (KR); Yeong Hwan Song, Suwon-si (KR); Young Seung Roh, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/596,204

(22) Filed: May 16, 2017

(65) Prior Publication Data

US 2018/0033534 A1    Feb. 1, 2018

(30) Foreign Application Priority Data

Jul. 29, 2016  (KR) .................. 10-2016-0097346
Oct. 31, 2016  (KR) .................. 10-2016-0143452

(51) Int. Cl.
| | |
|---|---|
| *H04B 5/00* | (2006.01) |
| *H01Q 3/00* | (2006.01) |
| *H01F 1/147* | (2006.01) |
| *H01F 27/245* | (2006.01) |
| *H01F 27/28* | (2006.01) |
| *H01F 1/047* | (2006.01) |

(52) U.S. Cl.
CPC ........... *H01F 27/245* (2013.01); *H01F 1/047* (2013.01); *H01F 27/28* (2013.01); *H04B 5/0031* (2013.01)

(58) Field of Classification Search
CPC ....... H04W 4/008; H04B 5/00; H04B 5/0031; H04B 5/0037; H04B 5/0056; H04B 5/0081; H01F 1/147; H01Q 3/00; H01Q 7/00; H01Q 7/06
See application file for complete search history.

(56) References Cited

U.S. PATENT DOCUMENTS

| | | | | |
|---|---|---|---|---|
| 5,716,462 A | * | 2/1998 | Sakurada ................ | H01F 1/057 148/302 |
| 2006/0266435 A1 | * | 11/2006 | Yang ................. | G06K 19/07771 148/105 |
| 2012/0098711 A1 | * | 4/2012 | Yosui ................. | G06K 7/10336 343/702 |

(Continued)

FOREIGN PATENT DOCUMENTS

| | | | | |
|---|---|---|---|---|
| EP | 2123783 A1 | * | 11/2009 | ............. H01F 1/147 |
| JP | 2005-39143 A | | 2/2005 | |

(Continued)

*Primary Examiner* — Blane Jackson
(74) *Attorney, Agent, or Firm* — NSIP Law

(57) ABSTRACT

A device for transmitting data includes a transmitting coil configured to receive and transmit the data signal and to generate a magnetic field, and a magnetic material provided on one surface of the transmitting coil. A ratio of a residual magnetic flux density and a saturation magnetic flux density of the magnetic material is greater in a direction that the material is magnetized than in a direction the material is not magnetized.

20 Claims, 12 Drawing Sheets

(56) References Cited

U.S. PATENT DOCUMENTS

| | | | | |
|---|---|---|---|---|
| 2012/0208606 A1* | 8/2012 | Kubo | ............... | G06K 19/07779 |
| | | | | 455/575.7 |
| 2014/0168019 A1* | 6/2014 | Hirobe | ..................... | H01Q 5/40 |
| | | | | 343/720 |
| 2014/0306656 A1* | 10/2014 | Tabata | .................... | H01F 38/14 |
| | | | | 320/108 |
| 2015/0311725 A1 | 10/2015 | Yamamoto et al. | | |
| 2015/0380821 A1* | 12/2015 | Parkins | ................ | H04R 1/1008 |
| | | | | 343/718 |
| 2017/0084982 A1* | 3/2017 | Fang | .................... | H04B 5/0056 |

FOREIGN PATENT DOCUMENTS

| | | |
|---|---|---|
| JP | 5656698 B2 | 1/2015 |
| JP | 2015-216828 A | 12/2015 |
| KR | 10-2015-0084213 A | 7/2015 |
| KR | 10-1584555 B1 | 1/2016 |

\* cited by examiner

MAGNETIC MATERIAL AND DEVICE FOR TRANSMITTING DATA USING THE SAME

CROSS-REFERENCE TO RELATED APPLICATION(S)

This application claims benefit of priority under 35 U.S.C. § 119(a) to Korean Patent Application Nos. 10-2016-0097346 filed on Jul. 29, 2016 and 10-2016-0143452 filed on Oct. 31, 2016, in the Korean Intellectual Property Office, the disclosures of which are incorporated herein by reference in their entirety for all purposes.

BACKGROUND

1. Field

The present disclosure relates to a magnetic material and a device for transmitting data using the same.

2. Description of Related Art

Wireless communications has been used for various purposes. Recently, various types of technology for wirelessly transmitting data to a range of communications targets have been developed. Technologies include wireless communication coils, while targets include mobile electronic apparatuses, such as a smartphones. However, in cases of technology for wirelessly transmitting data as described above, power consumed by the transmission of data may be increased in proportion to an amount of target data to be transmitted. In a mobile electronic apparatus environment in which a limited amount of power is available, such power consumption is a significant issue. Therefore, wirelessly transmitting data at low power in mobile electronic apparatus environments has recently been pursued.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to an aspect of the present disclosure, a device for transmitting data includes a transmitting coil configured to receive and transmit a data signal and to generate a magnetic field from the data signal. The device also includes a magnetic plate provided on one surface of the transmitting coil. The magnetic plate is made of a material in which a ratio of a residual magnetic flux density to a saturation magnetic flux density of the magnetic plate in a first direction is greater than a ratio of a residual magnetic flux density to a saturation magnetic flux density of the magnetic plate in a second direction, different from the first direction. The first direction corresponds to a direction of the magnetic field in a magnetic material.

The data signal of the device may include pulses shifted from a first state to one of a second state or a third state and then shifted from the second state or the third state to the first state. A second time required for a portion of the pulses to be shifted from the second state or the third state to the first state is longer than a first time required for the portion of the pulses to be shifted from the first state to the second state or the third state. The data signal of the device can be a voltage signal, where the first state is a state of 0 V, the second state is a positive peak voltage, and the third state is a negative peak voltage.

The data signal of the device may include pulses changed logarithmically over time, in sections, in a case in which the pulses are shifted from the second state or the third state to the first state. The data signal of the device can include pulses changed exponentially over time, in sections, in a case in which the pulses are shifted from the second state or the third state to the first state. The data signal of the device may include pulses changed step-wise over time, in sections, in a case in which the pulses are shifted from the first state to the second state or the third state. The data signal may include pulses changed linearly over time, in sections, in a case in which the pulses are shifted from the second state or the third state to the first state.

The device may satisfy the expression $1\ A/m \leq Hc \leq 1*10^4\ A/m$ in which Hc is a magnetic field intensity in a BH curve of the magnetic plate. The magnetic plate can have a magnetic permeability of 10 to $10^5$ at 2 Kilohertz (KHz).

The magnetic plate may be formed of at least one of an Fe—Si—B-based amorphous metal, an Fe—Si—B—Nb—Cu-based nanocrystalline metal, or an Fe—Ni-M-T-based permalloy metal. The magnetic plate can be formed using a metal ribbon annealed by a magnetic field applied to the metal ribbon in the first direction. The metal plate may be formed of at least one of an Fe—Si—B-based amorphous metal, an Fe—Si—B—Nb—Cu-based nanocrystalline metal, or an Fe—Ni-M-T-based permalloy metal (where M represents a metal or metalloid and T represents another transition metal).

The ratio of the residual magnetic flux density to the saturation magnetic flux density of the magnetic plate in the first direction may be greater than 1:2. The ratio of the residual magnetic flux density to the saturation magnetic flux density of the magnetic plate in the second direction can be 1:2 or less.

According to another aspect of the present disclosure, a magnetic material may be used in a device for transmitting data, generating a magnetic field to wirelessly transmit data. The magnetic material includes a material having a ratio of a residual magnetic flux density to a saturation magnetic flux density of the magnetic material in a first direction that is greater than a ratio of a residual magnetic flux density to a saturation magnetic flux density of the magnetic material in a second direction, which is different from the first direction. The first direction corresponds to a direction of the magnetic field in the magnetic material.

The magnetic material may have a ratio of the residual magnetic flux density to the saturation magnetic flux density of the magnetic material in the first direction is greater than 1:2. The magnetic material can satisfy the expression $1\ A/m \leq Hc \leq 1*10^4\ A/m$ in which Hc represents a magnetic field intensity in a BH curve of the magnetic material. The magnetic material may have a magnetic permeability of 10 to $10^5$ at 2 Kilohertz (KHz).

The magnetic material may be formed by applying a magnetic field to a metal ribbon in the first direction to anneal the metal ribbon, where the metal ribbon is formed of at least one of an Fe—Si—B-based amorphous metal, an Fe—Si—B—Nb—Cu-based nanocrystalline metal, or an Fe—Ni-metal-transition metal-based permalloy metal.

A transmitter includes a magnetized plate and a coil. The magnetized plate has a ratio of a residual magnetic flux density (Br_p) to a saturation magnetic flux density (Bsat_p) greater in a first direction the magnetized plate is magnetized than in a second direction in which the magnetized plate is not magnetized. The coil is formed adjacent to the magnetized plate and is wound orthogonally to the first direction.

The coil of the transmitter may be formed directly on the magnetized plate or parallel to the magnetized plate without directly contacting the magnetized plate. The magnetized plate of the transmitter can include a first magnetized plate and a second magnetized plate spaced apart from the first magnetized plate and magnetized in the first direction. The coil of the transmitter can include a first coil formed adjacent to the first magnetized plate and a second coil formed adjacent to the second magnetized plate that is wound orthogonally to the first direction. The first coil and second coil of the transmitter may be wound in opposite directions having currents supplied in a same direction or may be wound in a same direction having currents supplied in opposite directions.

In another general aspect, a magnetic ribbon used in wireless data transfer includes a ribbon comprising a soft magnetic material. The soft magnetic material is magnetized in a first direction and a ratio of a residual magnetic flux density (Br_p) to a saturation magnetic flux density (Bsat_p) is greater in the first direction than in a second direction in which the ribbon is not magnetized.

The magnetic ribbon may be magnetized horizontally or vertically. The magnetic ribbon can include an anti-ferromagnetic material selected from an amorphous metal ribbon, a nanocrystalline ribbon, or a permalloy. The magnetic ribbon may include a material selected from Fe—Si—B-based amorphous metal, Fe—Si—B—Nb—Cu-based nanocrystalline metal, or Fe—Ni-metal-transition metal-based permalloy metal.

Other features and aspects will be apparent from the following detailed description, the drawings, and the claims.

BRIEF DESCRIPTION OF DRAWINGS

The above and other aspects, features, and advantages of the present disclosure will be more clearly understood from the following detailed description taken in conjunction with the accompanying drawings, in which.

Figure 1A:
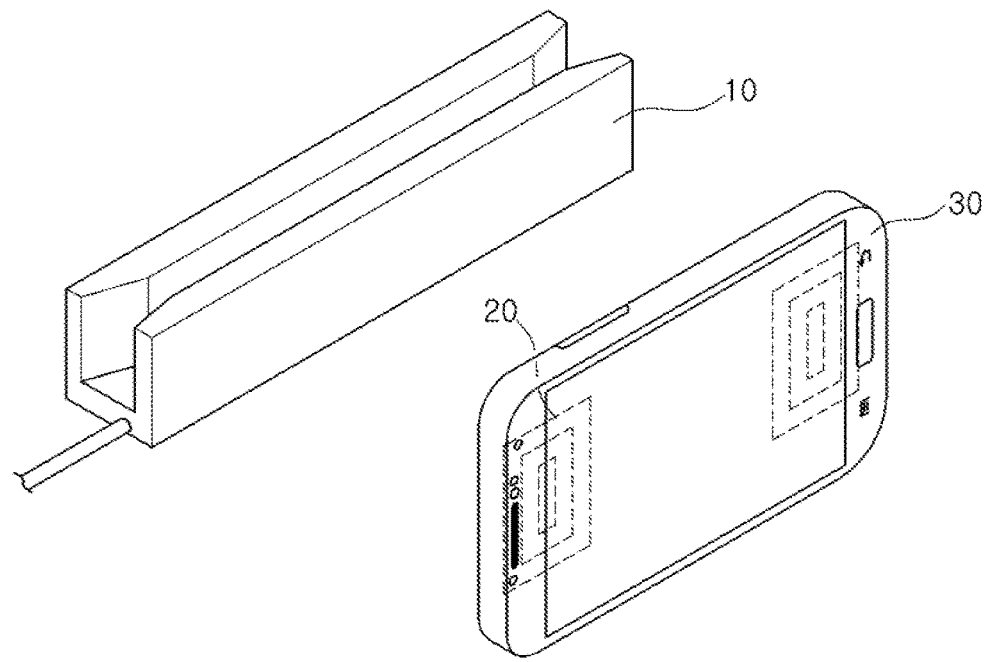
FIG. 1A is a perspective view illustrating an example in which a mobile terminal using a device for transmitting data according to an embodiment in the present disclosure performs wireless communications.

Throughout the drawings and the detailed description, the same reference numerals refer to the same elements, where applicable. The drawings may not be to scale, and the relative size, proportions, and depiction of elements in the drawings may be exaggerated for clarity, illustration, or convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure. The sequences of operations described herein are merely examples, and are not limited to those set forth herein, but may be changed as will be apparent after an understanding of the disclosure, with the exception of operations necessarily occurring in a certain order. Also, descriptions of functions and constructions that are well known may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure after an understanding of the application.

Throughout the specification, it will be understood that when an element, such as a layer, region or wafer (substrate), is referred to as being "on," "connected to," or "coupled to" another element, it can be directly "on," "connected to," or "coupled to" the other element, or other elements intervening therebetween may be present. In contrast, when an element is referred to as being "directly on," "directly connected to," or "directly coupled to" another element, there may be no elements or layers intervening therebetween. As used herein, the term "and/or" includes any and all combinations of one or more of the associated listed items.

The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The present description may provide a device for transmitting data capable of performing wireless communications at low power, and a magnetic material used in the device for transmitting data. Hereinafter, embodiments of the present disclosure will now be described in detail with reference to the accompanying drawings.

FIG. 1A is a perspective view illustrating an example in which a mobile terminal using a device for transmitting data according to an embodiment in the present disclosure performs wireless communications.

In FIG. 1A, a device 20 for transmitting data is used in a mobile terminal 30. The device 20 for transmitting data forms a magnetic field depending on control of the mobile terminal 30. The device 20 for transmitting data includes a transmitting coil, and is magnetically coupled to a device 10 to wirelessly transmit data. Device 10 is a device for receiving data and includes a receiving coil.

In FIG. 1A, a magnetic card reader 10 is illustrated as the device for receiving data including the receiving coil. In addition to the magnetic card reader 10 illustrated in FIG. 1A, various devices for receiving data may be used as the device for receiving data.

The device 20 for transmitting data may change a direction of a magnetic field to transmit target data to be transmitted, such as card number data, to the magnetic card reader 10. That is, the magnetic card reader 10 may generate the card number data using a change in a voltage across the receiving coil caused by the change in the direction of the magnetic field formed in the device 20 for transmitting data.

In an embodiment, the device 20 for transmitting data includes coils. The coils form one magnetic field, and some lines of magnetic force representing such a magnetic field may be represented as closed loops passing through the coils. That is, in this embodiment, the device 20 for transmitting data forms the magnetic field passing through the plurality of coils, having a widely diffused form. Therefore, the device 20 for transmitting data may be easily magnetically coupled to the magnetic card reader 10, even in a case in which a position or an angle of the receiving coil of the magnetic card reader 10 is changed.

Figure 1B:
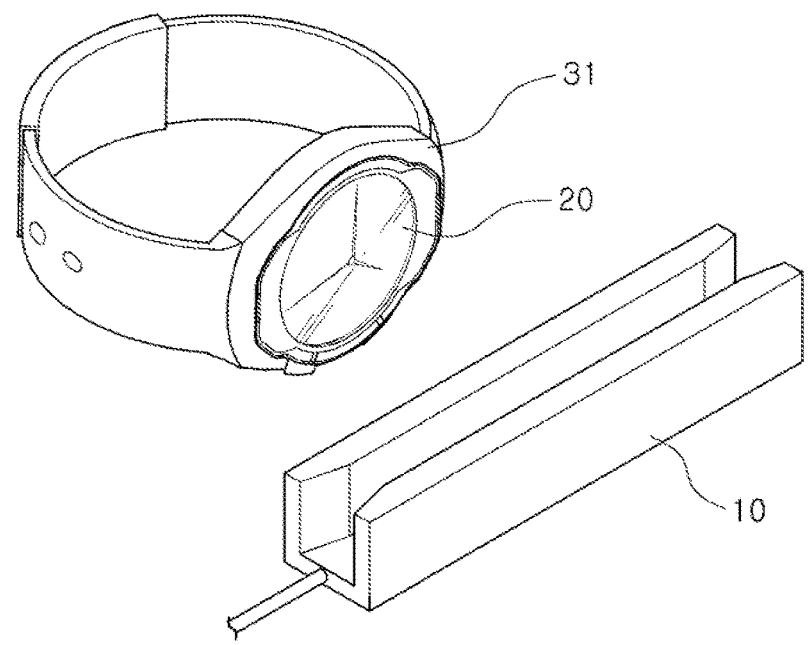
FIG. 1B is a perspective view illustrating an example in which a wearable apparatus using a device for transmitting data according to an embodiment in the present disclosure performs wireless communications.

FIG. 1B is a perspective view illustrating an example in which a wearable apparatus using a device for transmitting data according to an embodiment in the present disclosure performs wireless communications. In FIG. 1B, a device 20 for transmitting data may be used in a wearable apparatus 31. The device 20 for transmitting data forms a magnetic field depending on control of the wearable apparatus 31. That is, the device 20 for transmitting data forms the magnetic field through a transmitting coil, and is magnetically coupled to device 10 through the magnetic field to wirelessly transmit data to the device 10 for receiving data.

The wearable apparatus 31 may be an electronic apparatus worn on a human body part, such as an arm, the head, or the like, or fixed to a structure by a strap. Hereinafter, a case in which a wearable apparatus according to the present disclosure has a wristwatch form will be described, but the wearable apparatus is not limited thereto. Although not illustrated in FIGS. 1A and 1B, the device 20 for transmitting data may include a magnetic plate formed on one surface of the transmitting coil. Because a residual magnetic flux density of the magnetic plate is adjacent to a saturation magnetic flux density, a magnetic field that is already generated is effectively maintained at a high residual magnetic flux density. Therefore, data is effectively wirelessly transmitted, even at low power. This will be described below in more detail with reference to FIGS. 3 through 12.

Figure 2:
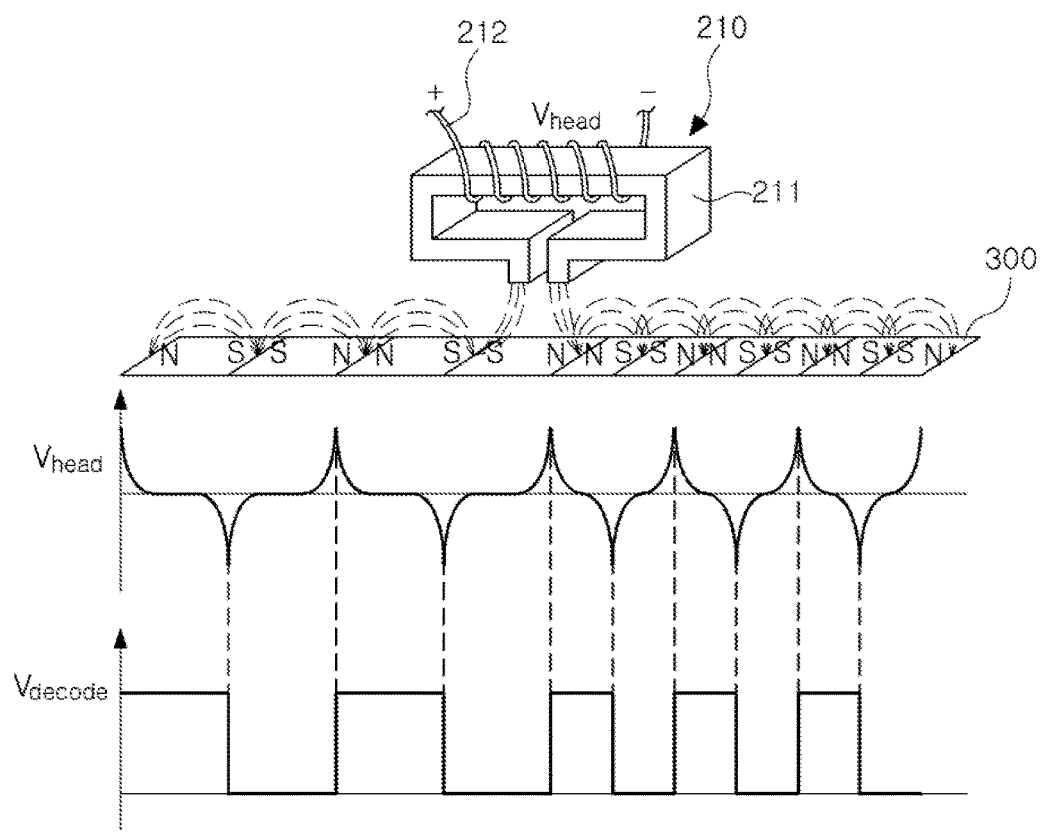
FIG. 2 is a view illustrating a magnetic head of a magnetic card reader for reading card data from a magnetic card.

First, an operation of the magnetic card reader will be described in more detail with reference to FIG. 2. In FIG. 2, a magnetic head 210 included in the magnetic card reader and a head voltage $V_{head}$ induced in the magnetic head by a magnetic card are illustrated. The magnetic head 210 may be magnetically coupled to a magnetic strip of the magnetic card to receive card data. Although not illustrated, the magnetic card reader 10 (see FIG. 1A) may include an analog to digital converter (not illustrated) in addition to the magnetic head 210. The head voltage $V_{head}$ is induced in the magnetic head 210 by magnetic flux. That is, the magnetic head 210 includes a core 211 and a receiving coil 212. The receiving coil 212 may be wound around a portion of the core 211.

When the magnetic head 210 is adjacent to the magnetic strip 300, a magnetic field is generated in the magnetic head 210 by the magnetic strip 300. A current flows in the receiving oil 212 from the magnetic field, such that the head voltage $V_{head}$ is generated across the receiving coil 212. In a case in which the receiving coil 212 of the magnetic head 210 is present in the magnetic field, the head voltage $V_{head}$ is induced in the receiving coil 212 by the magnetic flux. The induced head voltage $V_{head}$ is provided to the analog to digital converter, and the analog to digital converter may generate a decoded signal $V_{decode}$ from the head voltage. The decoded signal $V_{decode}$ may be a digital voltage signal, and card data may be generated from the decoded signal $V_{decode}$.

The magnetic strip 300 may be present in the magnetic card, and as described above, when the magnetic head 210 moves above the magnetic strip 300, the head voltage $V_{head}$ is induced in the receiving coil 212 of the magnetic head 210 by the magnetic flux. Meanwhile, the head voltage $V_{head}$ has a peak voltage depending on a polarity of the magnetic strip 300. For example, in a case in which the same polarities are adjacent to each other, the peak voltage is induced as the head voltage $V_{head}$.

The analog to digital converter may generate the decoded signal $V_{decode}$ from the head voltage $V_{head}$. For example, the analog to digital converter generates the decoded signal $V_{decode}$ by generating an edge whenever the peak voltage is detected. Because the decoded signal $V_{decode}$ is the digital voltage signal, digital data is decoded from the decoded signal $V_{decode}$.

For example, a bit value '1' or '0' is decoded depending on a length of a period of the decoded signal $V_{decode}$. In an example illustrated in FIG. 2, it may be appreciated that a first period and a second period of the decoded signal $V_{decode}$ are two times greater than a third period of the decoded signal $V_{decode}$. In this case, the first period and the second period of the decoded signal $V_{decode}$ are decoded as '1', and third to fifth periods of the decoded signal $V_{decode}$ are decoded as '0'. However, such a decoding scheme is only an example, and various decoding schemes may be used.

As described above, the magnetic head 210 included in the magnetic card reader detects the head voltage $V_{head}$ from the magnetic field to receive specified data (for example, card number data).

A case in which the magnetic head 210 performs decoding from the magnetic strip 300 of the magnetic card is illustrated in the example described above with reference to FIG. 2, but the magnetic head 210 may generate the head voltage by the magnetic field generated by the device 20 for transmitting data to receive specified data (for example, card number data). That is, the magnetic head 210 of the magnetic card reader is magnetically coupled to the transmitting coil of the device 20 for transmitting data to receive data such as the card number data. For example, the device 20 for transmitting data changes a direction of the magnetic field depending on a change in a polarity of the magnetic strip 300 to transmit the target data to be transmitted, such as the card number data, to the magnetic card reader 10.

Figure 3:
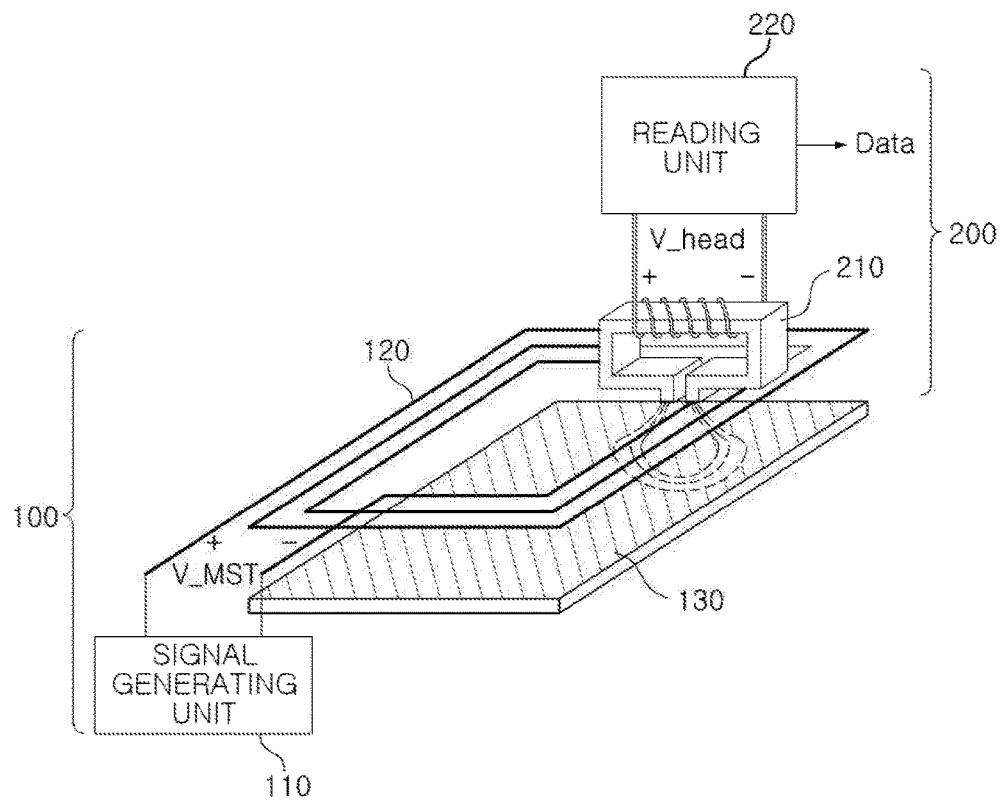
FIG. 3 is a view illustrating an example of a device for transmitting data according to an embodiment in the present disclosure.

Various examples of a device for transmitting data that may be applied in the present disclosure will hereinafter be described with reference to FIGS. 3 through 5. FIG. 3 is a view illustrating an example of a device for transmitting data according to an embodiment in the present disclosure.

Referring to FIG. 3, a device 100 for transmitting data includes a signal generating unit 110, a transmitting coil unit 120, and a magnetic plate 130. A device 200 for receiving data includes a magnetic head 210 and a reading unit 220. The device 100 for transmitting data may change a magnetic field depending on target data to be transmitted. The target data to be transmitted may be data encrypted for payment, such as credit card data, or the like. The signal generating unit 110 generates a data signal V_MST corresponding to the target data to be transmitted, and applies the generated data signal to the transmitting coil unit 120. For example, the data signal V_MST is a signal of which a voltage is changed or a signal of which a current is changed.

A magnetic field may be generated in the vicinity of the transmitting coil unit 120 by the data signal V_MST. In a case in which a change in a polarity is present in the data signal V_MST, a direction of the magnetic field is changed. That is, the data signal V_MST is the signal of which the voltage or the current is changed, and when such a data signal V_MST is applied to the transmitting coil unit 120, the magnetic field is generated in the vicinity of the transmitting coil unit 120 due to the Ampere's Law of Circuits.

In an embodiment illustrated in FIG. 3, the transmitting coil unit 120 may be one coil wound in relation to one axis or various coils such as a solenoid coil, or the like, in addition to the spiral coil as illustrated. The magnetic plate 130 is provided on one surface of the transmitting coil unit 120. A residual magnetic flux density and a saturation magnetic flux density of the magnetic plate 130 are within a specified range.

As an example, the residual magnetic flux density of the magnetic plate 130 may be adjacent to the saturation magnetic flux density of the magnetic plate 130. As another example, a ratio of a residual magnetic flux density to a saturation magnetic flux density of the magnetic plate 130 in a first direction and a ratio of a residual magnetic flux density to a saturation magnetic flux density of the magnetic plate 130 in a second direction are different from each other.

Magnetic characteristics of the magnetic plate 130 will be described below. Meanwhile, the device 200 for receiving data may output data in response to the change in the magnetic field generated by the device 100 for transmitting data. The magnetic head 210 includes a receiving coil wound around a core as described above with reference to FIG. 2. Because a head voltage $V_{head}$ of the receiving coil of the magnetic head 210 may be varied depending on a change in the surrounding magnetic field, the magnetic head 210 outputs the head voltage $V_{head}$ in response to the change in the magnetic field.

The reading unit 220 may output data in response to the head voltage $V_{head}$ of the receiving coil of the magnetic head 210. For example, the reading unit 220 senses the head voltage $V_{head}$ of the receiving coil of the magnetic head 210 and converts the sensed voltage into a digital signal to output the data. The data may be, for example, card data. The reading unit 220 may also output the data in response to a current flowing in the receiving coil of the magnetic head 210.

That is, when the data signal of which the voltage or the current is changed depending on the target data to be transmitted is applied to the transmitting coil unit 120, the magnetic flux may be generated in the vicinity of the transmitting coil unit 120 due to Ampere's Law of Circuits. When the magnetic flux is applied to a head portion of the magnetic head 210, the head voltage $V_{head}$ is generated across the receiving coil of the magnetic head 210.

As described above, technology of generating the data signal V_MST, applying the generated data signal V_MST to the transmitting coil unit 120 to form the magnetic field, and transmitting the data such as the card data, or the like, to the magnetic head 210 through the magnetic field is hereinafter termed magnetic secure transmission (MST). The magnetic secure transmission (MST) described above has an advantage in that an existing magnetic reader may be used as the device 200 for receiving data as it is.

Figure 4:
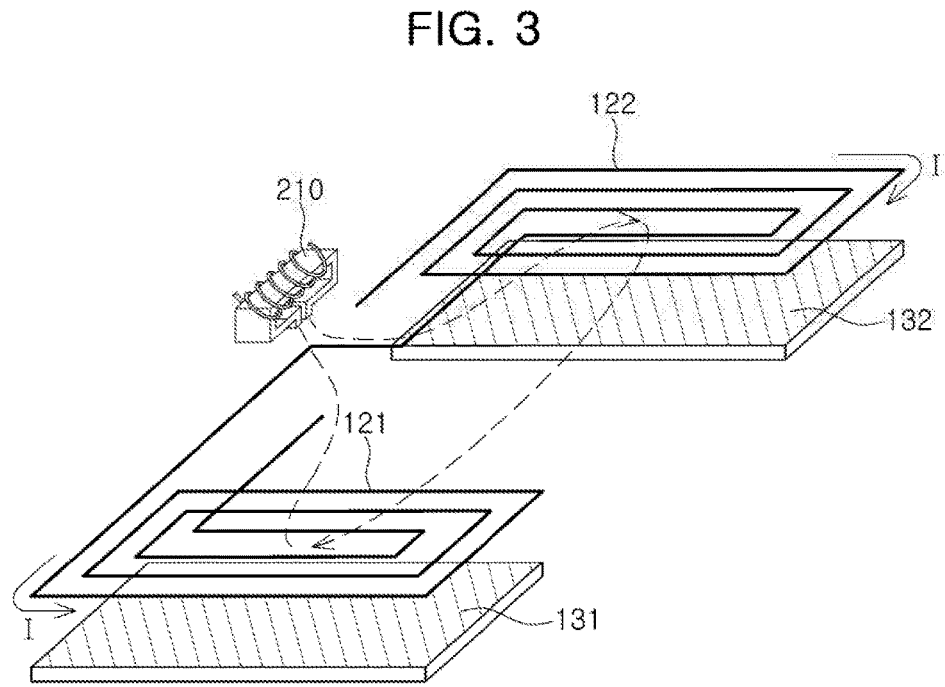
FIG. 4 is a view illustrating another example of a device for transmitting data according to an embodiment in the present disclosure.

FIG. 4 is a view illustrating another example of a device for transmitting data according to an embodiment in the present disclosure. In an embodiment illustrated in FIG. 4, an example in which a plurality of transmitting coils are used is illustrated. Referring to FIG. 4, a device for transmitting data may include a signal generating unit (not illustrated), transmitting coil units 121 and 122, and magnetic plates 131 and 132. Magnetic characteristics of the magnetic plates 131 and 132 will be described below.

A device for receiving data includes a magnetic head 210 and a reading unit (not illustrated). In an example illustrated in FIG. 4, transmission of data depending on magnetic coupling between the device for transmitting data and the device for receiving data will be easily understood from the contents described above with reference to FIG. 3. The transmitting coil units 121 and 122 include a first coil 121 and a second coil 122 spaced apart from the first coil 121.

In the example illustrated in FIG. 4, the first coil 121 and the second coil 122 are connected to each other in series, and directions in which the first coil 121 and the second coil 122 are wound may be different from each other (the first coil may be wound in a clockwise direction and the second coil may be wound in a counterclockwise direction). Therefore, a magnetic field in a central region of the first coil 121 is formed from the top toward the bottom, and a magnetic field in a central region of the second coil 122 is formed from the bottom toward the top. That is, because flow directions of the magnetic fields of the first coil 121 and the second coil 122 are opposite to each other, when the first coil 121 and the second coil 122 are disposed in parallel with each other, magnetic force having a closed loop shape flowing in the centers of the first coil 121 and the second coil 122 may be formed by overlap between the magnetic fields as in the example illustrated in FIG. 4.

Meanwhile, alternatively to the example illustrated in FIG. 4, the first coil 121 and the second coil 122 may also be wound in the same direction. In this case, a direction of a current flowing in the first coil and a direction of a current flowing in the second coil may be opposite to each other, such that magnetic fields may overlap each other through the first coil and the second coil to form a magnetic field which is widely spread.

As illustrated in FIG. 4, the first coil 121 and the second coil 122 form one magnetic field which is widely spread. A dotted line illustrated in FIG. 4 is a line of magnetic force representing some of the magnetic fields formed by the first coil 121 and the second coil 122, and the line of magnetic force may have a closed loop shape passing through the center of the first coil 121 and the center of the second coil 122. That is, because the first coil 121 and the second coil 122 are spaced apart from each other in the first direction (a horizontal direction in the example illustrated in FIG. 4), the magnetic field formed by the first coil 121 and the second coil 122 has a shape in which it is widely spread in the first direction.

The magnetic plates 131 and 132 are provided on one surface of the transmitting coil units 121 and 122, respectively. According to another embodiment, the magnetic plates 131 and 132 may also be one magnetic plate covering both of the first coil 121 and the second coil 122. As illustrated in FIG. 4, the transmitting coil units form a magnetic field having a widely spread form, using the first coil 121 and the second coil 122. Therefore, the magnetic head 210 stably performs magnetic coupling to the transmitting coil units in any position.

For example, in a case in which the device for transmitting data is provided in a mobile terminal, the magnetic head 210 is stably magnetically coupled to the transmitting coil units even though it is positioned in any portion of the mobile terminal, and magnetic secure transmission (MST) thus is applied in wide fields.

Figure 5:
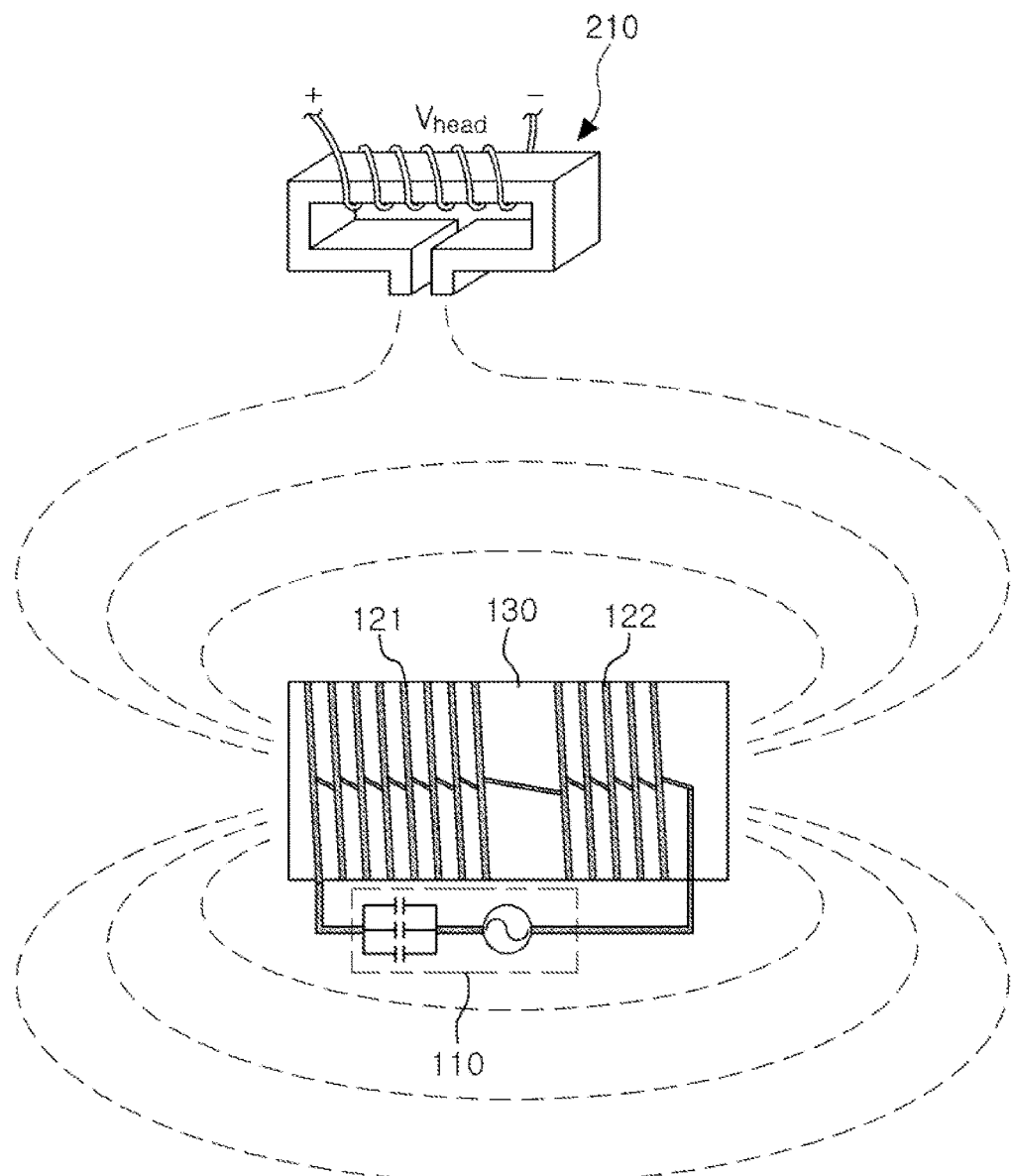
FIG. 5 is a view illustrating another example of a device for transmitting data according to an embodiment in the present disclosure.

FIG. 5 is a view illustrating another example of a device for transmitting data according to an embodiment in the present disclosure. In an example illustrated in FIG. 5, a device for transmitting data includes a signal generating unit 110, transmitting coil units 121 and 122, and a magnetic plate 130. A device for receiving data includes a magnetic head 210 and a reading unit (not illustrated), as described above. The transmitting coil units include a first coil 121 and a second coil 122, and the first coil 121 and the second coil 122 may have a form in which they are wound around the magnetic plate 130. That is, the first coil 121 and the second coil 122 may be a type of solenoid coil.

As in the example illustrated in FIG. 5, the first coil 121 and the second coil 122 may be solenoid coils disposed in parallel with each other. In this example, the first coil 121 and the second coil 122 have the same winding direction and the same current direction (or opposite winding directions or opposite current directions) so that magnetic fields are generated in the same direction. Therefore, as illustrated in FIG. 5, some of the magnetic fields pass through both of the centers of the first coil and the second coil, and the magnetic fields are widely formed in the first direction. Therefore, magnetic secure transmission (MST) is applied in wide fields.

In the examples illustrated in FIGS. 3 through 5, the devices for transmitting data may include the magnetic plate 130 or 131 and 132. The magnetic plates may have a specific relationship between a residual magnetic flux density and a saturation magnetic flux density. For example, the residual magnetic flux density has a value adjacent to the saturation magnetic flux density. Therefore, power required for transmitting a data signal may be significantly reduced.

Hereinafter, with reference to FIGS. 6 through 10F, features of a magnetic material according to embodiments in the present disclosure and a magnetic plate using the same will be described, and a form of a data signal depending on the features of the magnetic material and the magnetic plate will be described. In addition, a significant reduction in power consumed by transferring data will be described.

Figure 6:
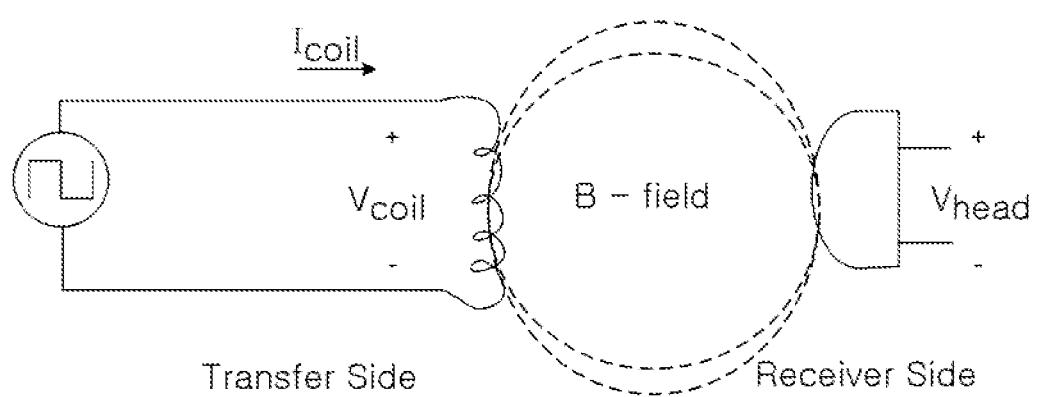
FIG. 6 is a view schematically illustrating an example of a coupled state of the device for transmitting data illustrated in FIGS. 3 through 5 and a magnetic head.

FIG. 6 is a view schematically illustrating a coupled state of the device for transmitting data illustrated in FIGS. 3 through 5 and a magnetic head. Referring to FIG. 6, the signal generating unit 110 applies the data signal to the transmitting coil, and a coil current $I_{coil}$ flows in the transmitting coil by the data signal. Therefore, the transmitting coil forms a magnetic field B-field. In addition, a coil voltage $V_{coil}$ is formed across the transmitting coil. The head voltage $V_{head}$ is induced in the magnetic head 210 due to an influence of the magnetic field B-field, and the data may be received by decoding the head voltage, as described above.

Figure 7:
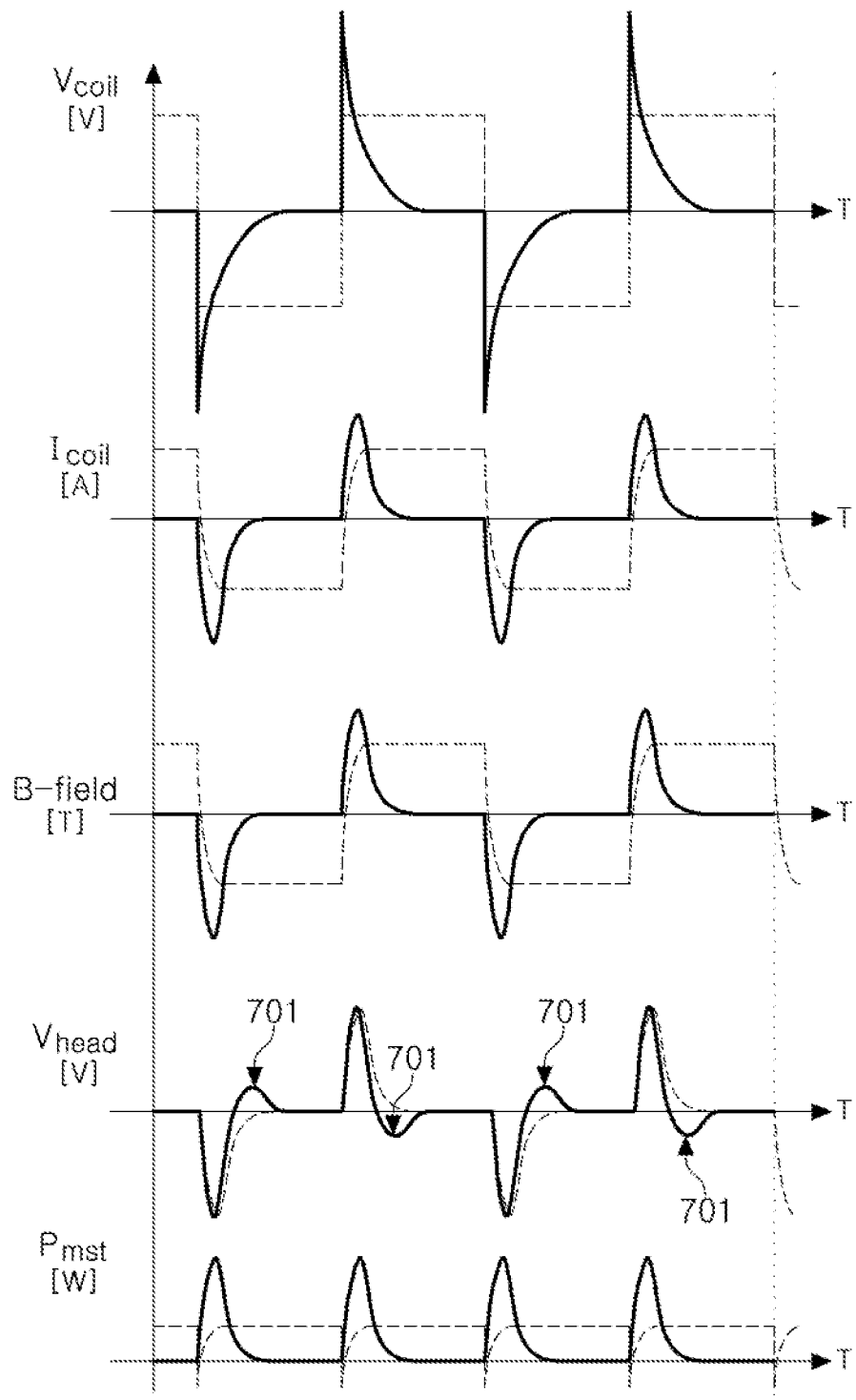
FIG. 7 is a set of graphs illustrating waveforms of various signals in a case in which a voltage signal Vcoil is applied as a data signal to a transmitting coil in a comparative example in which a general magnetic plate is used.

FIG. 7 is a set of graphs illustrating waveforms of various signals in a case in which a voltage signal $V_{coil}$ is applied as a data signal to a transmitting coil in a comparative example in which a general magnetic plate is used. In FIG. 7, $V_{coil}$ refers to a coil voltage of a device for transmitting data, $I_{coil}$ refers to a coil current of the device for transmitting data, and a change in magnetic flux density of a magnetic material depending on the coil voltage and the coil current is illustrated. In addition, $V_{head}$ refers to a head voltage of a magnetic head, and $P_{mst}$ refers to power consumed by the device for transmitting data.

As illustrated in FIG. 7, in the comparative example illustrated by dotted lines, a square wave voltage signal is used. In this case, a specified voltage needs to be maintained for a specified time, such that more power is consumed by the device for transmitting data to transmit a data signal.

On the other hand, in an embodiment in the present disclosure illustrated by a solid line, a signal having an asymmetrical waveform may be used as a data signal, for example, a voltage signal $V_{coil}$. Therefore, in a case in which a data signal having the asymmetrical waveform rather than a square wave is used, power consumed by transmitting the data signal may be reduced.

The data signal having the asymmetrical waveform may include pulses shifted from a first state to a second state or a third state in a relatively short time and shifted from the second state or the third state to the first state in a relatively long time. In an example illustrated in FIG. 7, a positive pulse and a negative pulse of the voltage signal $V_{coil}$, which is the data signal, is alternately provided.

Likewise, it may be appreciated that a second time required for the positive pulse to be shifted from the second state in which a voltage value is a positive peak value to the first state in which the voltage value is 0 is longer than a first time required for the positive pulse to be shifted from the first state in which the voltage value is 0 to the second state in which the voltage value is the positive peak value. It may be appreciated that a second time required for the negative pulse to be shifted from the second state in which a voltage value is a negative peak value to the first state in which the voltage value is 0 is also longer than a first time required for the negative pulse to be shifted from the first state in which the voltage value is 0 to the second state in which the voltage value is the negative peak value.

As described above, in the embodiment in the present disclosure, the voltage signal $V_{coil}$ having the asymmetrical waveform is used, such that the coil current $I_{coil}$ and the magnetic field B-field may also have an asymmetrical waveform similar to that of the voltage signal $V_{coil}$. Because the consumed power $P_{mst}$ of the device for transmitting data is determined from a magnitude of the coil voltage $V_{coil}$ and the coil current $I_{coil}$, an amount of consumed power may be significantly reduced by using the asymmetrical waveform such as a peak shaped pulse, a waveform similar to the peak shaped pulse, or the like, in the embodiment in the present disclosure as illustrated in FIG. 7.

However, in this case, there is a limitation that the magnetic B-field is limited. In addition, a reduction gradient of the magnetic field B-field is relatively high, such that noise 701 having opposite polarities to noise of the head voltage $V_{head}$ detected in the magnetic head are generated in the head voltage $V_{head}$. There is the possibility that the data signal will be erroneously received due to the noise having opposite polarities. Therefore, in the embodiment in the present disclosure, a magnetic plate having magnetic characteristics such as a residual magnetic flux density of a specified level or more may be provided on one surface of the transmitting coil. This allows the magnetic field to remain for a specified time or more, even in the case that the voltage signal $V_{coil}$ having the asymmetrical waveform is used. Thereby, the noise 701 having the opposite polarity is significantly reduced.

Figure 8:
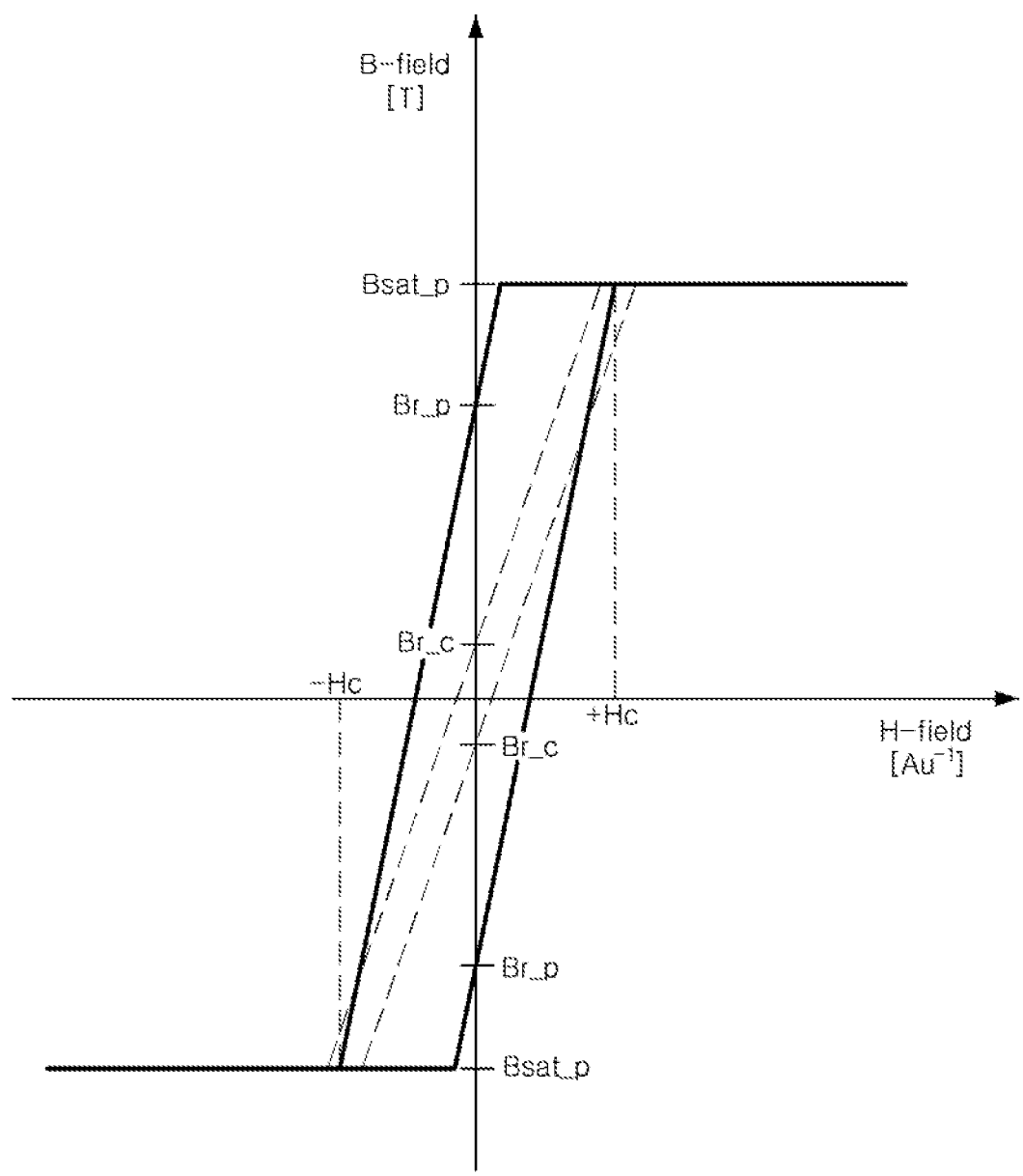
FIG. 8 is a set of graphs illustrating BH characteristics of a magnetic material according to an embodiment in the present disclosure.

Magnetic characteristics of the magnetic material according to the embodiment in the present disclosure will hereinafter be described with reference to FIG. 8. FIG. 8 is a set of graphs illustrating BH characteristics of a magnetic material according to an embodiment in the present disclosure. In the graphs illustrated in FIG. 8, solid lines are graphs representing BH characteristics of a magnetic material according to an embodiment in the present disclosure, and dotted lines are graphs representing BH characteristics of a general magnetic material according to a comparative example.

As illustrated in FIG. 8, in the magnetic material according to the embodiment in the present disclosure, magnitudes of residual magnetic flux densities +Br_p and −Br_p are great, such that BH hysteresis curves are more angular. That is, it may be appreciated that in the magnetic material according to the embodiment in the present disclosure, values of saturation magnetic flux densities +Bsat_p and −Bsat_p and values of the residual magnetic flux densities +Br_p and −Br_p are adjacent to each other to be within a specified range.

For example, a ratio of the residual magnetic flux densities +Br_p and −Br_p to the saturation magnetic flux densities +Bsat_p and −Bsat_p are respectively greater than 1:2. That is, residual magnetic flux densities +Br_p and −Br_p have respective values closer to the saturation magnetic flux densities +Bsat_p and −Bsat_p than to 0. Meanwhile, in a BH curve of the magnetic material, a magnetic field intensity Hc satisfies the following Equation 1:

$$1 \text{ A/m} \leq Hc \leq 1*10^4 \text{ A/m}. \quad \text{[Equation 1]}$$

In addition, the magnetic material satisfies a magnetic permeability of 10 to $10^5$ at 2 KHz. The magnetic material may be at least one of an Fe—Si—B-based amorphous metal, an Fe—Si—B—Nb—Cu-based nanocrystalline metal, and an Fe—Ni-M-T-based permalloy metal. As described above, in the magnetic material according to the embodiment in the present disclosure, the residual magnetic flux densities +Br_p and −Br_p have a magnitude of a specified level or more to maintain the magnetic field.

Figure 9:
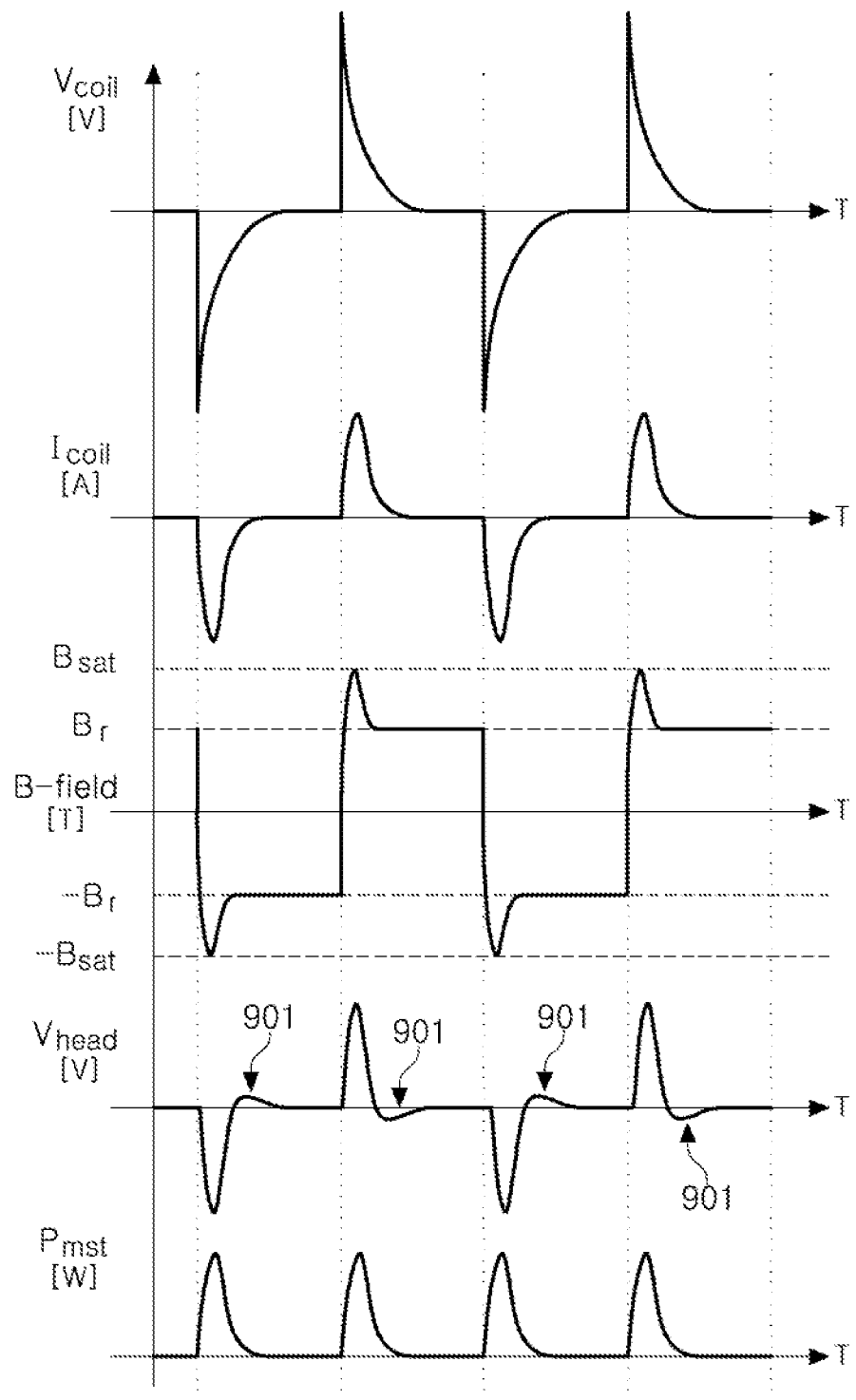
FIG. 9 is a set of graphs illustrating waveforms of various signals in a case in which a voltage signal Vcoil is applied as a data signal to a transmitting coil in the device for transmitting data in which the magnetic plate using the magnetic material according to the embodiment in the present disclosure is used.

FIG. 9 is a set of graphs illustrating waveforms of various signals in a case in which a voltage signal $V_{coil}$ is applied as a data signal to a transmitting coil in the device for transmitting data in which the magnetic plate using the magnetic material according to the embodiment in the present disclosure is used. As illustrated in FIG. 9, a voltage signal $V_{coil}$ having an asymmetrical waveform is used, similar to FIG. 7. That is, the signal having the asymmetrical waveform is used as a data signal, and an amount of consumed power is thus significantly reduced.

When the voltage signal $V_{coil}$ having the asymmetrical waveform is applied to the transmitting coil, a coil current $I_{coil}$ having an asymmetrical waveform similar to that of the voltage signal flows in the transmitting coil. A magnetic field is formed by the coil current $I_{coil}$. Meanwhile, when the voltage signal $V_{coil}$ is changed to 0 V, the coil current $I_{coil}$ is also changed to 0 V.

However, it may be appreciated from FIG. 9 that the magnetic field that is already formed is maintained to some degree at magnitudes of residual magnetic flux densities +Br and −Br. That is, although the magnetic field B-field is also somewhat reduced in a section in which the coil current $I_{coil}$ is reduced, the magnetic field is maintained at residual magnetic flux densities +Br and −Br after being somewhat reduced. Therefore, noise 901 having opposite polarities to noise of the head voltage $V_{head}$, generated in the head voltage $V_{head}$ are very small, to significantly reduce the possibility of erroneous recognition generated when the data signal is transmitted.

FIGS. 10A through 10F are graphs illustrating various examples of asymmetric data signals that may be used in the present disclosure. Although various asymmetric data signals are illustrated in FIGS. 10A through 10F, they are only some of various examples. That is, in addition to the examples illustrated in FIGS. 10A through 10F, data signals having various asymmetrical waveforms may be used as data signals.

The asymmetric data signals illustrated in FIGS. 10A through 10F may include pulses shifted from a first state to a second state or a third state and then shifted from the second state or the third state to the first state. Here, it may be appreciated that a second time required for at least a portion of the pulses to be shifted from the second state or the third state to the first state is longer than a first time required for at least a portion of the pulses to be shifted from the first state to the second state or the third state.

That is, the asymmetric data signal may be a coil voltage or a coil current, and may include various pulses shifted from the first state to the second state (for example, a positive peak value) or the third state (for example, a negative peak value) in a relatively short time and shifted from the second state or the third state to the first state in a relatively long time.

The coil voltage will be described by way of example. In a case in which pulses of a data signal are changed from 0 V to a positive peak value or a negative peak value (for example, in a form of a step function), a condition that a change rate over time is a first reference value or more may be satisfied, and in a case in which the pulses of the data signal are changed from the positive peak value or the negative peak value to 0 V (for example, in other forms except the form of the step function), a condition that a change rate over time is a second reference value or less may be satisfied. Here, the first reference value may be equal to or greater than the second reference value.

As a result, each of the pulses of the data signal may be linearly changed, be changed in a form of an exponential function, or be changed in a form of a non-linear function in a case in which it is changed from the positive peak value or the negative peak value to 0 V.

Figure 10A:
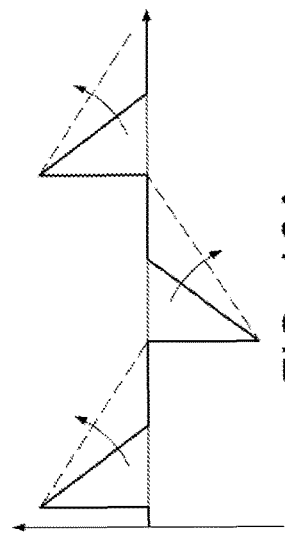
FIGS. 10A through 10F are views illustrating an example of a magnetic material having magnetic flux direction characteristics by magnetic field annealing according to embodiments in the present disclosure.
Figure 10B:
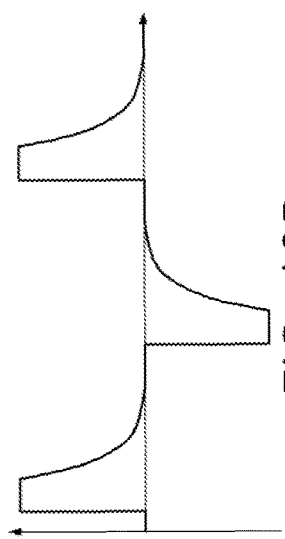
Figure 10C:
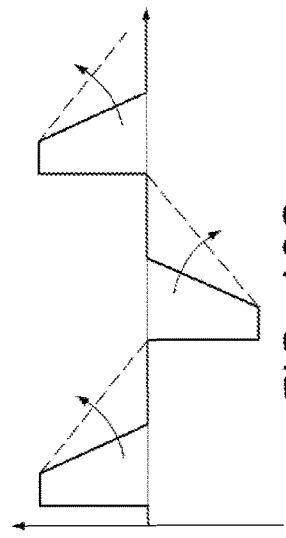

Meanwhile, as illustrated in FIGS. 10A and 10C, in a case in which the data signal is changed from the positive peak value or the negative peak value to 0 V, a gradient may be linearly changed over time. As the gradient becomes gentle, the possibility that an error in a process of transmitting data will occur may be further reduced, and as the gradient becomes steep, consumed power is further reduced.

Alternatively, as illustrated in FIGS. 10B and 10C, the data signal may also be maintained in the positive peak value or the negative peak value for a specified time. The data signal is implemented as described above, such that the possibility that an error in the process of transmitting data (that is, a case in which transmitted data and received data are different from each other) will occur is further reduced.

Figure 10D:
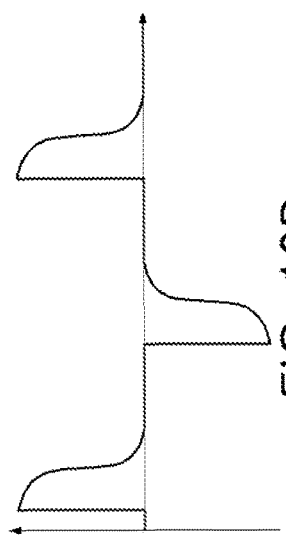
Figure 10E:
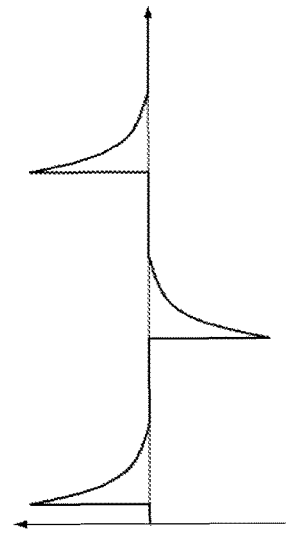
Figure 10F:
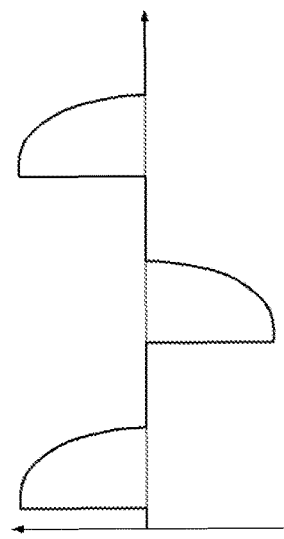

Alternatively, as illustrated in FIGS. 10D, 10E, and 10F, in a case in which pulses of data signal are changed from the positive peak value or the negative peak value to 0 V, the pulses of the data signal may be changed in a form of an exponential function, be changed in a form of a quadratic function, or a form of a logarithmic function over time in at least some sections.

Figure 11A:
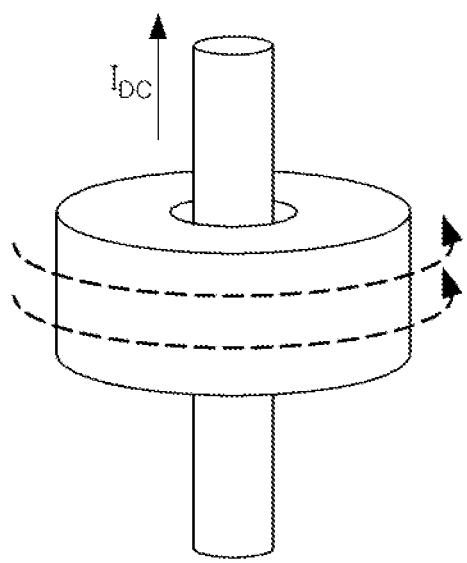
FIGS. 11A and 11B are views illustrating magnetic field annealing schemes according to embodiments in the present disclosure.
Figure 11B:
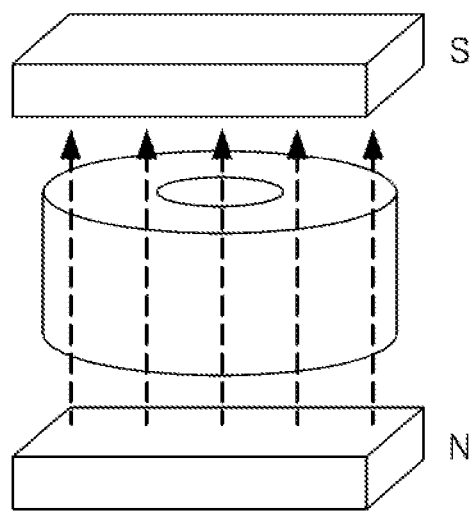
Figure 12A:
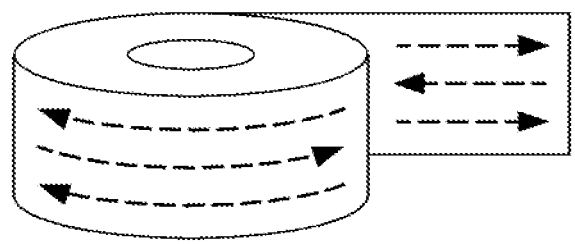
FIGS. 12A and 12B are views illustrating a magnetic material having the abovementioned magnetic flux characteristics with respect to a specific direction through the magnetic field annealing of FIGS. 11A and 11B.
Figure 12B:
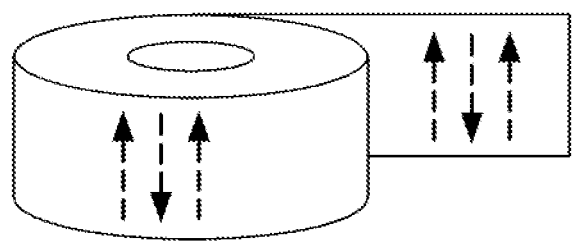

An embodiment in which the residual magnetic flux densities in characteristics of the magnetic material itself are a specified level or more has been described above with reference to FIG. 9. Meanwhile, in another embodiment in the present disclosure, magnetic field annealing may be performed on a magnetic material to satisfy a condition that a residual magnetic flux density in a specific direction is a specified level or more. FIGS. 11A and 11B are views illustrating magnetic field annealing schemes according to an embodiment in the present disclosure. In detail, FIGS. 11A and 11B illustrate an example of performing magnetic field annealing by exposing a metal ribbon constituting a magnetic material to a magnetic field. FIGS. 12A and 12B are views illustrating a magnetic material having the above-mentioned magnetic flux characteristics with respect to a specific direction through the magnetic field annealing of FIGS. 11A and 11B.

FIG. 11A is a view illustrating magnetic field annealing in a horizontal direction, and FIG. 11B is a view illustrating magnetic field annealing in a vertical direction. FIG. 12A illustrates magnetic characteristics of a metal ribbon on which the magnetic field annealing in the horizontal direction as illustrated in FIG. 11A is performed, and FIG. 12B illustrates magnetic characteristics of a metal ribbon on which the magnetic field annealing in the vertical direction as illustrated in FIG. 11B is performed.

When magnetic field annealing is performed on the metal ribbon by exposing the metal ribbon to a specified magnetic field, the metal ribbon may have a residual magnetic flux density of a specified level or more in a direction of the magnetic field. Therefore, in a case of forming a magnetic material using such a metal ribbon, the corresponding magnetic material may have a high residual magnetic flux density in the direction of the magnetic field.

When the direction of the magnetic field to which the metal ribbon is exposed is a first direction, a ratio of a residual magnetic flux density to a saturation magnetic flux density of the magnetic material in the first direction may be greater than a ratio of a residual magnetic flux density to a saturation magnetic flux density of the magnetic material in a second direction, which is different from the first direction.

For example, a ratio of a residual magnetic flux density to a saturation magnetic flux density of the magnetic plate in the first direction is greater than 1:2. Meanwhile, a ratio of a residual magnetic flux density to a saturation magnetic flux density of the magnetic plate in the second direction, different from the first direction, is 1:2 or less.

The metal ribbon may be formed of a soft magnetic material such as an amorphous ribbon, a nanocrystalline ribbon, Mu metal, Permalloy, SENSORVAC®, or the like, or various anti-ferromagnetic substances having a high magnetic permeability. Alternatively, the metal ribbon may be formed of at least one of an Fe—Si—B-based amorphous metal, an Fe—Si—B—Nb—Cu-based nanocrystalline metal, or an Fe—Ni-M-T-based permalloy metal (where M represents a metal or metalloid and T represents another transition metal).

Meanwhile, a case of raising residual magnetic flux characteristics of the magnetic material in a specified direction using the magnetic field annealing is illustrated in FIGS. 11A through 12B, but the magnetic material may have high residual magnetic flux characteristics in a specific direction through stress annealing, or the like.

Figure 13:
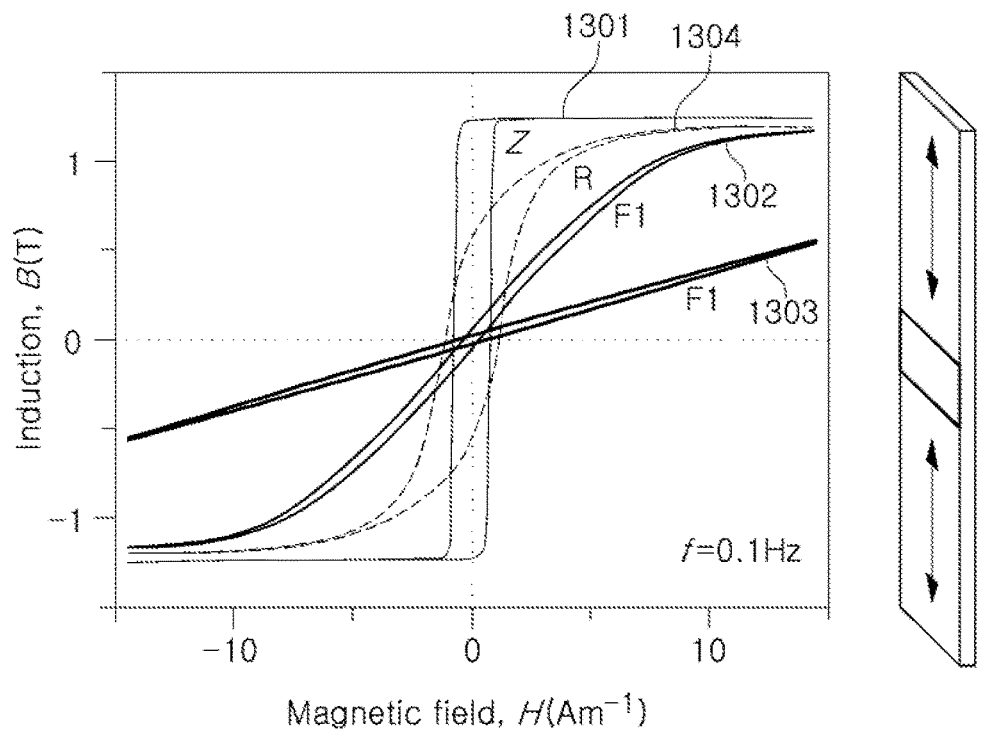
FIG. 13 is a set of graphs illustrating magnetic characteristics of a magnetic material in each direction generated through annealing.

FIG. 13 is a set of graphs illustrating magnetic characteristics of a magnetic material in each direction generated through annealing. In FIG. 13, with respect to a magnetic material 1310 on which magnetic field annealing in a vertical direction is performed, a BH curve Z 1301 in the vertical direction, a BH curve F2 1302 in a diagonal direction, a BH curve F1 1303 in a horizontal direction, and a BH curve R 1304 in a state in which the magnetic field annealing is not performed are illustrated.

It may be appreciated from the BH curve Z 1301 that the magnetic material 1310 has a high residual magnetic flux density in the vertical direction since the magnetic field annealing in the vertical direction is performed on the magnetic material 1310. In addition, it may be appreciated that a gradient (that is, a magnetic permeability) of a graph of magnetic flux density characteristics in the vertical direction is great. That is, the magnetic material 1310 on which the magnetic field annealing is performed may have residual magnetic flux densities of a specified level or more, similar to the magnetic material described above with reference to FIG. 9 in a direction of the magnetic field, and BH hysteresis curves may be more angular. Therefore, it may be appreciated that in the magnetic material 1310 on which the magnetic field annealing in the vertical direction is performed, values of saturation magnetic flux densities +Bsat_p and −Bsat_p and values of residual magnetic flux densities +Br_p and −Br_p in the vertical direction are adjacent to each other to be within a specified range.

For example, a ratio of the residual magnetic flux densities +Br_p and −Br_p to the saturation magnetic flux densities +Bsat_p and −Bsat_p are greater than 1:2. That is, residual magnetic flux densities +Br_p and −Br_p have a value closer to the saturation magnetic flux densities +Bsat_p and −Bsat_p than to 0. Alternatively, in a BH curve of the magnetic material, a magnetic field intensity Hc also satisfies the above Equation 1. In addition, the magnetic material satisfies a magnetic permeability of 10 to $10^5$ at 2 KHz. The magnetic material may be at least one of an Fe—Si—B-based amorphous metal, an Fe—Si—B—Nb—Cu-based nanocrystalline metal, and an Fe—Ni-M-T-based permalloy metal.

Meanwhile, it may be appreciated from the BH curve F1 1303 that the magnetic material 1310 on which the magnetic field annealing is performed has a low residual magnetic flux density in a direction perpendicular in the direction of the magnetic field, that is, the horizontal direction. In addition, it may be appreciated from the BH curve F2 1302 that the magnetic material 1310 on which the magnetic field annealing is performed has a relatively low residual magnetic flux density in a direction oblique with respect to the direction of the magnetic field. As a result, at the time of performing annealing on the magnetic material, a magnetic permeability of the metal ribbon may be increased in the specific direction, that is, the direction of the magnetic field, to increase an amount or a density of magnetic flux induced in the corresponding direction.

Figure 14:
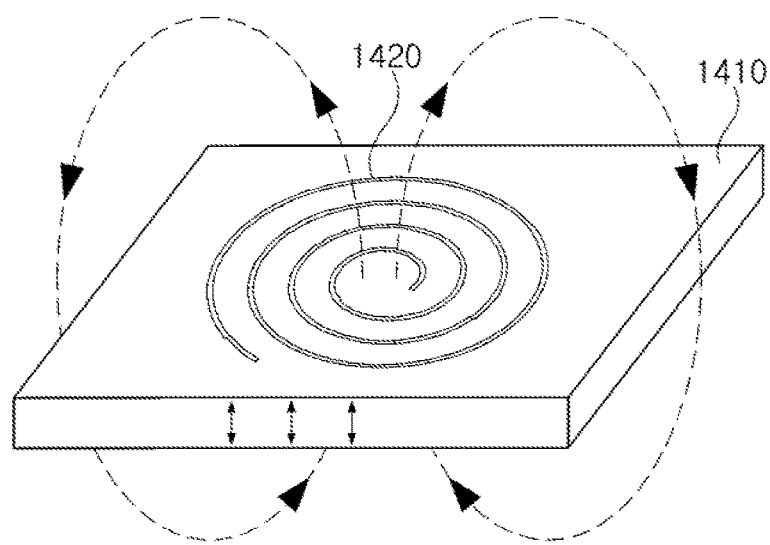
FIG. 14 is a view illustrating a magnetic plate using the magnetic material formed through the annealing of FIG. 13.

FIG. 14 is a view illustrating a magnetic plate using the magnetic material formed through the annealing of FIG. 13. Referring to FIG. 14, a transmitting coil 1420 may be provided on one surface of a magnetic plate 1410. Because a spiral coil is illustrated as an example of the transmitting coil 1420, a magnetic field is formed in a direction in which it passes through the center of the transmitting coil 1420.

The magnetic plate 1410 is subjected to magnetic field annealing in a thickness direction in an example illustrated in FIG. 14. Therefore, the magnetic plate 1410 is subjected to magnetic field annealing to have a magnetic flux density of a specified level or more in a direction of a magnetic field, that is, the thickness direction. Thus, even after a coil current flowing in the transmitting coil 1420 is changed into 0 V, a magnetic field that is already generated may remain at a magnitude of a specified level or more due to an influence of a residual magnetic flux density of the magnetic plate 1410. Therefore, it may be easily understood from the contents described above that even though an asymmetric peak type data signal is used, the data signal is accurately provided by the residual magnetic field.

As set forth above, according to embodiments in the present disclosure, power required for wirelessly transmitting data is significantly reduced. According to the embodiments, the possibility of erroneous recognition of data is significantly reduced even though the data are wirelessly transmitted using minimum power. While embodiments have been shown and described above, it will be apparent after an understanding of the disclosure that modifications and variations could be made without departing from the scope of the present application as defined by the appended claims.

What is claimed is:

1. A device for transmitting data, comprising:
a transmitting coil configured to receive and transmit a data signal and to generate a magnetic field from the data signal; and
a magnetic plate provided on one surface of the transmitting coil,
wherein the magnetic plate comprises a magnetic material in which a ratio of a residual magnetic flux density to a saturation magnetic flux density of the magnetic plate in a first direction is greater than a ratio of a residual magnetic flux density to a saturation magnetic flux density of the magnetic plate in a second direction, different from the first direction, and
the first direction corresponds to a direction of the magnetic field in the magnetic plate.

2. The device for transmitting data of claim 1, wherein the data signal includes pulses shifted from a first state to one of a second state or a third state and then shifted from the second state or the third state to the first state, and
a second time required for a portion of the pulses to be shifted from the second state or the third state to the first state is longer than a first time required for the portion of the pulses to be shifted from the first state to the second state or the third state.

3. The device for transmitting data of claim 2, wherein the data signal is a voltage signal, and the first state is a state of 0 V, the second state is a state of a positive peak voltage, and the third state is a state of a negative peak voltage.

4. The device for transmitting data of claim 2, wherein the data signal includes pulses changed logarithmically over time, in sections, in a case in which the pulses are shifted from the second state or the third state to the first state.

5. The device for transmitting data of claim 2, wherein the data signal includes pulses changed exponentially over time, in sections, in a case in which the pulses are shifted from the second state or the third state to the first state.

6. The device for transmitting data of claim 2, wherein the data signal includes pulses changed step-wise over time, in sections, in a case in which the pulses are shifted from the first state to the second state or the third state, and
the data signal includes pulses changed linearly over time in sections in a case in which the pulses are shifted from the second state or the third state to the first state.

7. The device for transmitting data of claim 1, wherein 1 A/m≤Hc≤1*10$^4$ A/m in which Hc is a magnetic field intensity in a BH curve of the magnetic plate.

8. The device for transmitting data of claim 1, wherein the magnetic plate comprises a magnetic permeability of 10 to 10$^5$ at 2 Kilohertz (KHz).

9. The device for transmitting data of claim 1, wherein the magnetic plate is formed of at least one of an Fe—Si—B-based amorphous metal, an Fe—Si—B—Nb—Cu-based nanocrystalline metal, or an Fe—Ni-M-T-based permalloy metal, wherein M represents a metal or metalloid and T represents another transition metal.

10. The device for transmitting data of claim 1, wherein the magnetic plate is formed using a metal ribbon annealed by a magnetic field applied thereto in the first direction and formed of at least one of an Fe—Si—B-based amorphous metal, an Fe—Si—B—Nb—Cu-based nanocrystalline metal, or an Fe—Ni-M-T-based permalloy metal, wherein M represents a metal or metalloid and T represents another transition metal.

11. The device for transmitting data of claim 10, wherein the ratio of the residual magnetic flux density to the saturation magnetic flux density of the magnetic plate in the first direction is greater than 1:2, and
the ratio of the residual magnetic flux density to the saturation magnetic flux density of the magnetic plate in the second direction is 1:2 or less.

12. A magnetic material used in a device for transmitting data, generating a magnetic field to wirelessly transmit data, comprising:
a material having a ratio of a residual magnetic flux density to a saturation magnetic flux density of the magnetic material in a first direction greater than a ratio of a residual magnetic flux density to a saturation magnetic flux density of the magnetic material in a second direction, different from the first direction,
wherein the first direction corresponds to a direction of the magnetic field in the magnetic material.

13. The magnetic material of claim 12, wherein the ratio of the residual magnetic flux density to the saturation magnetic flux density of the magnetic material in the first direction is greater than 1:2.

14. The magnetic material of claim 12, wherein 1 A/m≤Hc≤1*10$^4$ A/m in which Hc represents a magnetic field intensity in a BH curve of the magnetic material.

15. The magnetic material of claim 12, wherein the magnetic material has a magnetic permeability of 10 to 10$^5$ at 2 Kilohertz (KHz).

16. The magnetic material of claim 12, wherein the magnetic material is formed by applying a magnetic field to a metal ribbon in the first direction to anneal the metal ribbon, the metal ribbon being formed of at least one of an Fe—Si—B-based amorphous metal, an Fe—Si—B—Nb—Cu-based nanocrystalline metal, or an Fe—Ni-M-T-based permalloy metal, wherein M represents a metal or metalloid and T represents another transition metal.

17. A transmitter comprising:
a magnetized plate having a ratio of a residual magnetic flux density (Br_p) to a saturation magnetic flux density (Bsat_p) greater in a first direction the magnetized plate is magnetized than in a second direction in which the magnetized plate is not magnetized; and
a coil formed adjacent to the magnetized plate, wherein the coil is wound orthogonally to the first direction.

18. The transmitter of claim 17, wherein the coil is formed directly on the magnetized plate.

19. The transmitter of claim 17, wherein:
the magnetized plate comprises a first magnetized plate and a second magnetized plate spaced apart from the first magnetized plate and magnetized in the first direction; and
the coil comprises a first coil formed adjacent to the first magnetized plate and a second coil formed adjacent to the second magnetized plate,
wherein the second coil is wound orthogonally to the first direction.

20. The transmitter of claim 19, wherein the first coil and second coil are wound in opposite directions having currents supplied in a same direction or the first coil and the second coil are wound in a same direction having currents supplied in opposite directions.

* * * * *